US008360336B2

(12) United States Patent  (10) Patent No.: US 8,360,336 B2
Luckett  (45) Date of Patent: Jan. 29, 2013

(54) RACK AND METHOD OF FORMING THE SAME

(75) Inventor: Nick G. Luckett, Wolverhampton (GB)

(73) Assignee: Minivator Limited (GB)

( * ) Notice: Subject to any disclaimer, the term of this patent is extended or adjusted under 35 U.S.C. 154(b) by 665 days.

(21) Appl. No.: 12/559,035

(22) Filed: Sep. 14, 2009

(65) Prior Publication Data
US 2010/0064835 A1  Mar. 18, 2010

(51) Int. Cl.
F16H 1/00 (2006.01)
(52) U.S. Cl. .......................................... 238/123; 74/422
(58) Field of Classification Search .................. 238/123; 105/29.1, 29.2, 127; 74/422; 219/615; 187/200–202
See application file for complete search history.

(56) References Cited

U.S. PATENT DOCUMENTS

| 3,670,397 A | 6/1972 | Lewis |
| 3,718,052 A | 2/1973 | Barr et al. |
| 3,835,676 A | 9/1974 | Foote |
| 3,879,026 A | 4/1975 | Lappin, Jr. |
| 4,570,542 A * | 2/1986 | Cable et al. .................. 104/119 |
| 5,439,257 A | 8/1995 | Williamson |
| 2006/0117984 A1 | 6/2006 | Carlsen |
| 2007/0221707 A1 | 9/2007 | Smith |
| 2007/0269676 A1 * | 11/2007 | Singer et al. .................. 428/627 |

FOREIGN PATENT DOCUMENTS

| EP | 1 230 309 | 4/1971 |
| EP | 0372533 | 12/1988 |
| EP | 1011913 | 9/1997 |
| GB | 976237 | 11/1964 |
| GB | 2 421 236 | 6/2006 |
| GB | 2 428 664 | 2/2007 |
| JP | 62-136655 | 8/1987 |
| WO | WO 98/08634 | 3/1998 |
| WO | WO 99/26779 | 6/1999 |
| WO | WO 01/32453 | 5/2001 |
| WO | WO 2007/109159 | 9/2007 |
| ZA | 9308341 | 8/1992 |

OTHER PUBLICATIONS

European Communication, dated Sep. 4, 2010, 6 pgs.
Great Britain Search Report dated Oct. 19, 2009, 2 pgs.
Great Britain Search Report dated Jul. 3, 2009.
European Communication and Search Report dated Dec. 15, 2009, 8 pages.

* cited by examiner

*Primary Examiner* — S. Joseph Morano
*Assistant Examiner* — Zachary Kuhfuss
(74) *Attorney, Agent, or Firm* — Frank J. DeRosa; Brian S. Goncalves; Frommer Lawrence & Haug LLP (57) ABSTRACT

A method of forming a rack (45) (e.g. of the type used in a geared system such as a rack and pinion), suitable for use in a stairlift rail, comprises providing a plurality (30) of elongate strips (10) and securing the plurality of strips together as a stack of strips to form the rack. The strips may be profiled to provide a profile to the rack. Preferably the profile provides a toothed rack on which a gear or roller of a stairlift carriage may be driven. The rack may be formed in a continuous process. The rack may be straight or curved. A rack comprising a plurality of elongate strips secured together as a stack of strips is also described.

12 Claims, 12 Drawing Sheets

RACK AND METHOD OF FORMING THE SAME

This application claims priority benefits to British application number 0816861.9 filed Sep. 15, 2008, the disclosure of which is hereby incorporated by reference.

The present invention relates to a rack and a method of forming the same. In particular, but not exclusively, the present invention relates to a rack (e.g. of the type suitable for use in a geared system such as a rack and pinion) comprising a plurality of laminates. Embodiments of the invention are suitable for use in a stairlift rail.

Stairlifts provide transportation of a person (or a wheelchair or such like) up and down stairs, assisting people who find ascending and descending stairs difficult and in particular those with limited mobility. Typically, a rail is mounted to or near a flight of stairs and a chair (or platform for a wheelchair) is mounted via a carriage on the rail. The carriage can be controlled by the user via a control means to travel along the rail and up and down the stairs. The rail may be straight or curved, depending on the configuration of the staircase up and down which the stairlift is required to travel.

Stairlift rails are often manufactured from aluminium or steel, and are available in a variety of different cross sections. Often the stairlift rail is formed by extrusion. However, such stairlift rails can be slow and costly to produce. They can be heavy, which has cost implications for manufacture and impedes installation. As a result, they are generally only produced in relatively short lengths—particularly for domestic installations—meaning that a plurality of lengths of rail may need to be joined together to form the required length of rail. Problems can arise in joining discrete rail sections together as it is not easy to provide a smooth continuous rail for the carriage to travel along. This is particularly so for curved stairlift rails that bend both in radius and helix. Any distortion or imperfection at section joints may undesirably lead to jolting movements during travel, which could be uncomfortable or even painful for the stairlift user.

The present invention has been devised with the foregoing in mind.

According to a first aspect of the present invention, there is provided a method of forming a rack as defined in claim 1.

According to a second aspect of the present invention there is provided a laminate rack as defined in claim 11.

According to a third aspect of the present invention, there is provided a stairlift rail comprising a rack as defined in claim 19.

In each of the first and second aspects of the invention, forming the stairlift rack from a plurality of laminates, rather than by a conventional machining process, advantageously enables manufacture in longer lengths, meaning that manufacture and installation is both less expensive and easier. In addition, the rack is advantageously substantially homogeneous and of uniform thickness.

Furthermore, the production may be achieved using a continuous process. That is to say, the process line may be run continuously to give a high efficiency—unlike conventionally machined processes which limit the length and number of sections processed at one time. Furthermore, it is necessary for operators to load and unload a conventionally machined process, exacerbating the inefficiency.

In an embodiment, the method may comprise removing portions of material from each of the strips so as to reduce the mass thereof. Consequently, this advantageously reduces the mass of the rack produced, facilitating manufacture and installation of the rack.

Each strip may be profiled. Preferably, the profiling comprises providing a plurality of teeth. More preferably, securing the strips together comprises aligning the profiles such that the stack of laminates has the same profile. This produces a 'toothed' rack suitable for use with a gear/roller e.g. in a stairlift. Aligning the laminates advantageously strengthens the rack at the tooth flank and enables the load across the laminates to be applied in a homogeneous manner.

Material may also be removed from 'neutral areas' of the laminates in order to reduce the mass of each laminate, and thus the mass of the rack overall. This advantageously enables speedier material handling in production compared with conventional milling processes.

In an embodiment, the securing of the strips comprises brazing, and preferably induction brazing. Most preferably, copper brazing is utilized. In an embodiment, interference brazing is also utilized. In an embodiment, this involves providing features on some or all of the strips, engageable with the strips adjacent thereto, to assist with the induction brazing. The copper brazing advantageously enables the laminated stack to be bent isotropically, thus enabling curved racks to be produced for use in curved stairlift rails.

Shielding may be provided to one or both sides of the rail. The shielding may comprise an elongate strip attached to one or both sides of the stack (e.g. by brazing). Preferably, the shielding is sized such that the majority of the stack is housed within the shielding. Advantageously, this houses the profile of the toothed laminates, making the rail safer for use.

The rack may be manipulated, curved or bent to provide a curved or bent rack. Advantageously, during the manipulating or bending of the rail, the positional relationship of adjacent strips remains substantially constant.

A composite rack may be provided, formed of a plurality of sections of rack joined together to form a length of rack. Straight and/or curved sections of rack may be used. When used in a stairlift application, this enables a rail system for a stairlift to be provided in any stairway or stairwell, accommodating any corners, turns or bends.

A plurality of racks may be provided end to end to form a continuous rack suitable for use in a stairlift rack. In an embodiment, one or more laminates within the stack may be staggered with respect to each other to help ensure a smooth transition at the joint there between and ensure that load is spread over and along the rail homogeneously. The profiles of the staggered laminates may be aligned to form a continuous rack with no pitch error.

Embodiments of the present invention will now be described with reference to the following drawings in which.

Figure 1A:
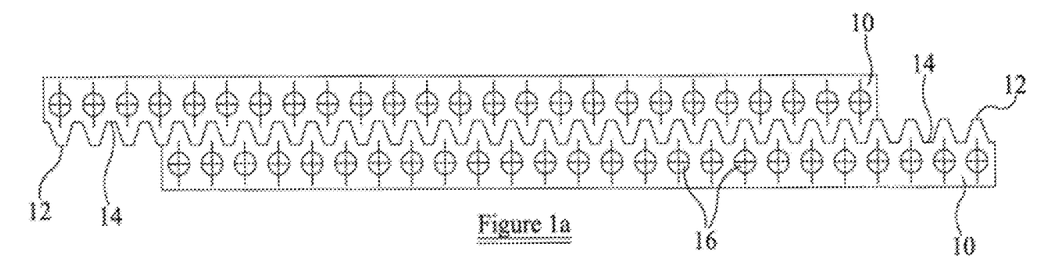
FIGS. 1a-1c show profiled strips used in embodiments of the present invention at various stages in the manufacturing process.

Referring to FIG. 1a, two elongate strips (or laminates) 10 are shown. The strips 10 are profiled to have peaks 12 and troughs 14 to produce a 'toothed' profile. Apertures 16 may be provided in the strip 10 to reduce the mass of the strip 10. The strips are preferably formed from metal such as mild steel or stainless steel.

Figures 1B, 1C:
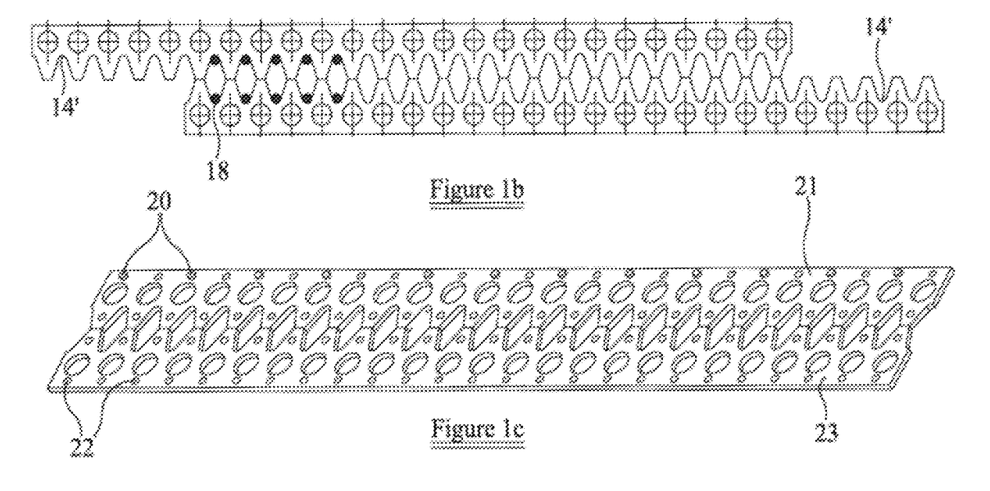

The troughs 14 in the strips 10 may be shaved to reduce the root radius, at location 18 as shown in FIG. 1b. This produces rounded off troughs 14' in the strips 10. It is an advantage that two strips may be produced together as a symmetrical profile, and then further processed to produce a root radius. The root radius is preferred for strength to thus reduces stress levels. Alternatively, a flat bottom profile could be used, provided the loading is acceptable, which would remove the need for further processing to produce the radius 18.

The strips 10 may be formed from continuous sheet metal on a coil. Sheet metal of a desired size in blank form (but limited by mass e.g. typically 1-3 tonne coils) may be used. To form the strips 10, the metal is uncoiled and straightened and "fed" through a continuous process e.g. to profile it. At the end of the process line, the metal can be recoiled onto spools, cut into specified lengths as required or further processed into laminates to form a stairlift rack. The continuous process may be split into manageable chunks. Therefore the profile may first be cut and then restored on to coils. Then, these coils may be taken into the copper brazing continuous process line for amalgamating numerous laminate layers, brazing and cutting to length.

By comparison, the machines that currently produce conventional extruded rack have a limitation on length and number of units processed at the same time. Loading and unloading must also, disadvantageously, be performed by operators.

Figure 1D:
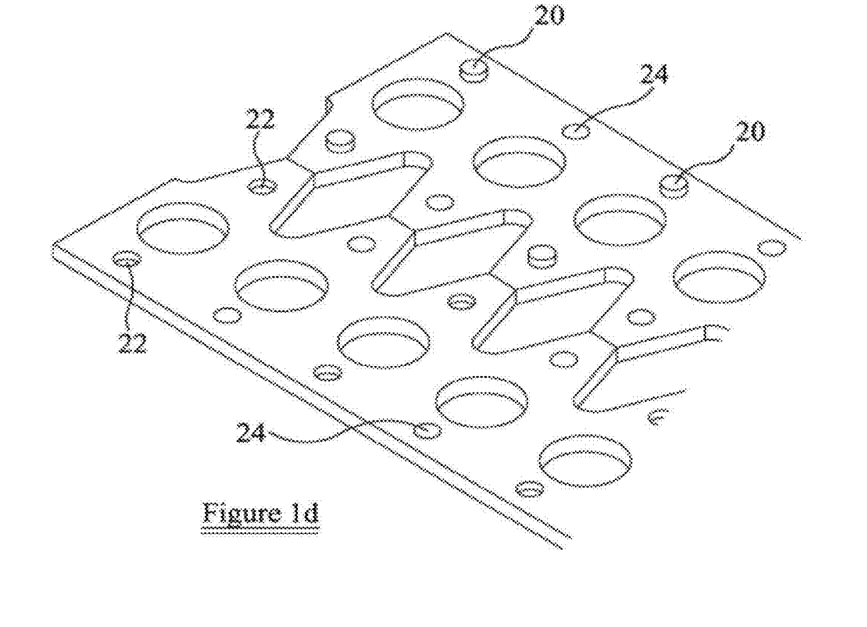
FIG. 1d is an enlarged view of a portion of FIG. 1c.

FIGS. 1c and 1d show pressed features 20, 22 & 24 that are used to create an interference fit between adjacent strips 10. The strips are pressed to create protuberances 20 and corresponding apertures or hollows 22, 24 into which the protuberances 20 are sized to fit. The protuberances 20 can be made to fit together back to back if symmetry is required, although this is more complex with regard to tool design. The protuberances 20 and hollows 22, 24 help bond the strips 10 together. The protuberances 20 and hollows 22 also help to keep the strips aligned with respect to each other, to preserve their positional relationship. However, additional bonding (e.g. brazing) may be desirable, as will be described in more detail below. FIG. 1c also shows the principal surfaces 21 of the strips 10, which have a small thickness 21. FIG. 1d is an enlarged view of FIG. 1c, which shows the protuberances 20 and hollows 22 (or holes 24) in more detail.

FIGS. 2a to 2d represent the stages in the production of a rack 30 for use in a stairlift rail.

Figure 2A:
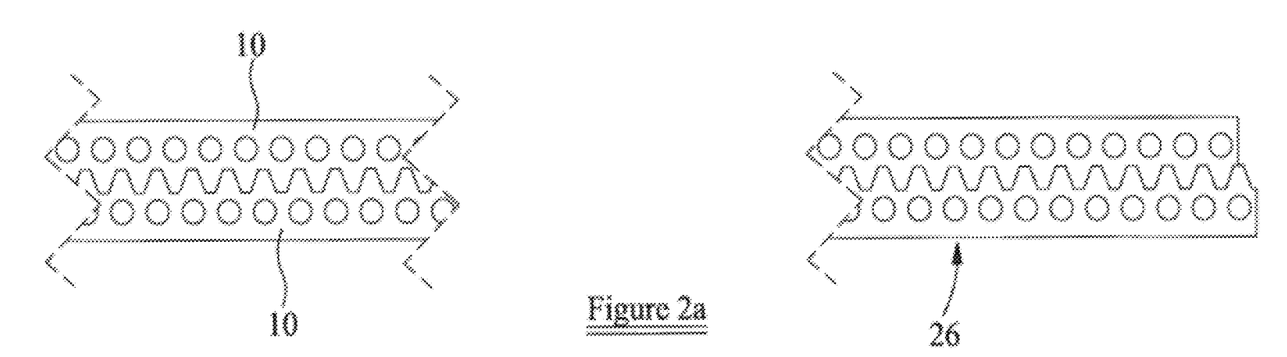
FIGS. 2a-2d illustrate the stages of the process for forming a laminate rack for use in a stairlift rail according to embodiments of the present invention.

FIG. 2a represents two elongate strips 10 being pressed from a single, larger strip 26. Alternatively, each strip 10 may be produced individually from a single strip or multiple strips may be produced from a wide strip 26. In the embodiment shown in FIG. 2a, two strips 10 are produced, each having a toothed profile. The apertures 16 may also be produced at this stage of the continuous process, again using conventional pressing techniques. Similarly, the interference features 20, 22, 24 are pressed into the strips 10.

Figure 2B:
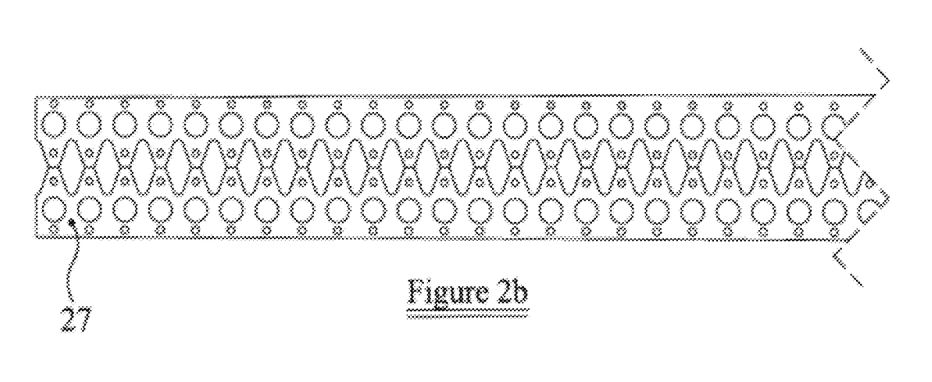

The next stage in the process is to re-pitch (i.e. align) the features 22 and 24 and separate the two strips 10 that have been formed—as shown in FIG. 2b. FIG. 2b also shows the further pressing that is performed in order to reduce the root radius of the troughs 14 (as described above in relation to FIG. 1b). At this stage, a brazing material, such as copper paste 27, is applied to the surface of the strip 10, for subsequent copper brazing. Alternatively, any process creating a union of two materials can be used (e.g. seam welding or laser welding).

Figures 2C, 2D:
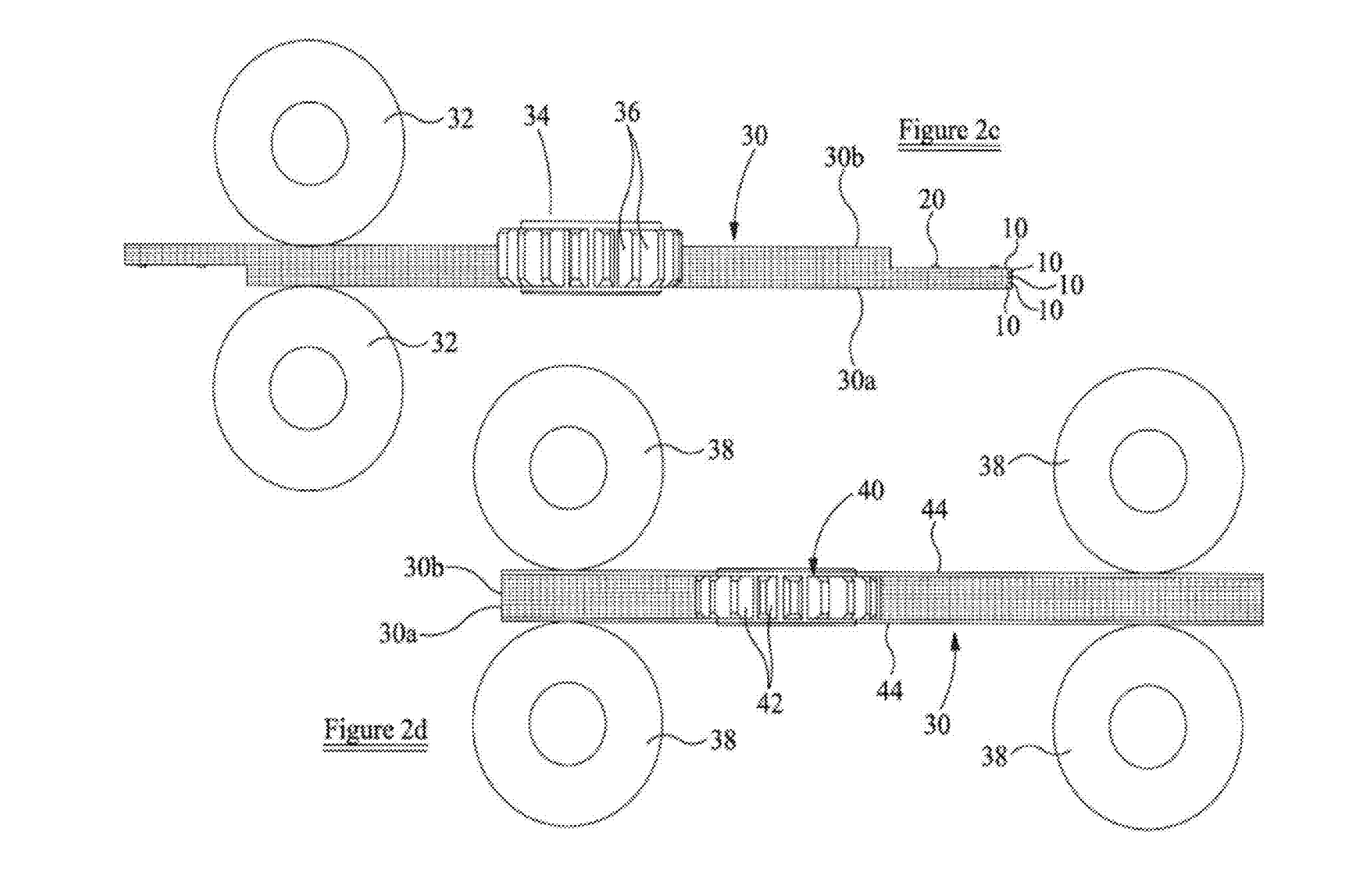
Figure 3A:
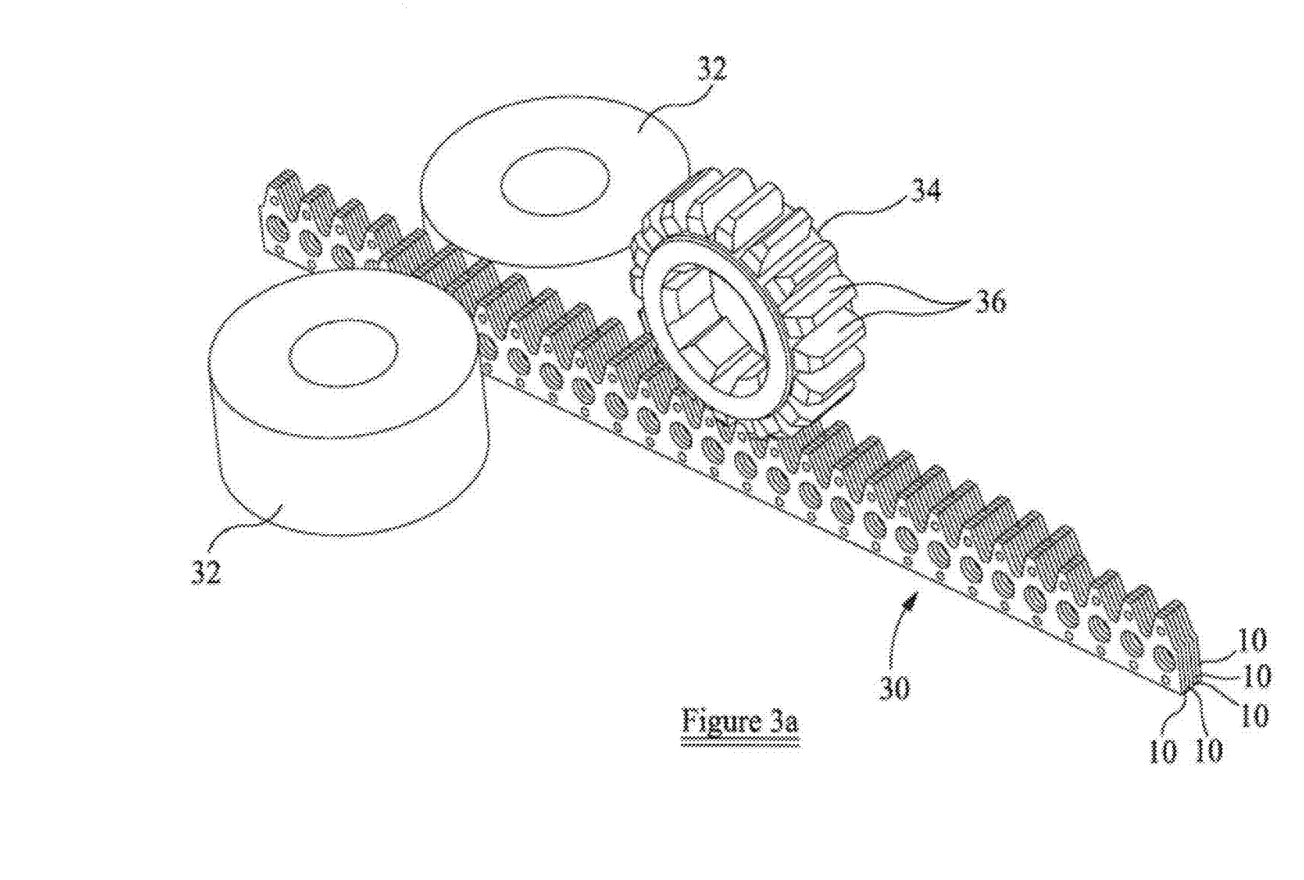
FIGS. 3a and 3b show alternative views of the stages shown in FIGS. 2c and 2d.

A plurality 30 of elongate strips 10 are then grouped together—principal surfaces adjacent each other—by a coil feed (as referred to above in connection with the description of the continuous process). The strips are driven through pinch rollers 32, as illustrated in FIGS. 2c and 3a. A driven gear 34 ensures that the profile of the strips is pitch-timed to ensure that the peaks 12 and troughs 14' line up with each other. The gear 34 has a series of spaced teeth 36 that are sized to fit within the troughs 14' of the stack 30. In this way, the interference features 20, 22, 24 are pressed together. In these figures, the rack is made from two banks of asymmetrical protuberances (viewed from the top of the teeth) staggered so that the interference features 20, 22, 24 fit together to give a smooth outer face to each side of the rack and be symmetrical. Alternatively, a bank of strips all facing the same protuberance direction could be produced if so required. This would produce an asymmetric profile when viewed from the top of the teeth.

FIGS. 2c and 3a show two groups of laminates 30a, 30b staggered with respect to each other. The significance of this is described with respect to FIGS. 6 and 7 below.

Figure 3B:
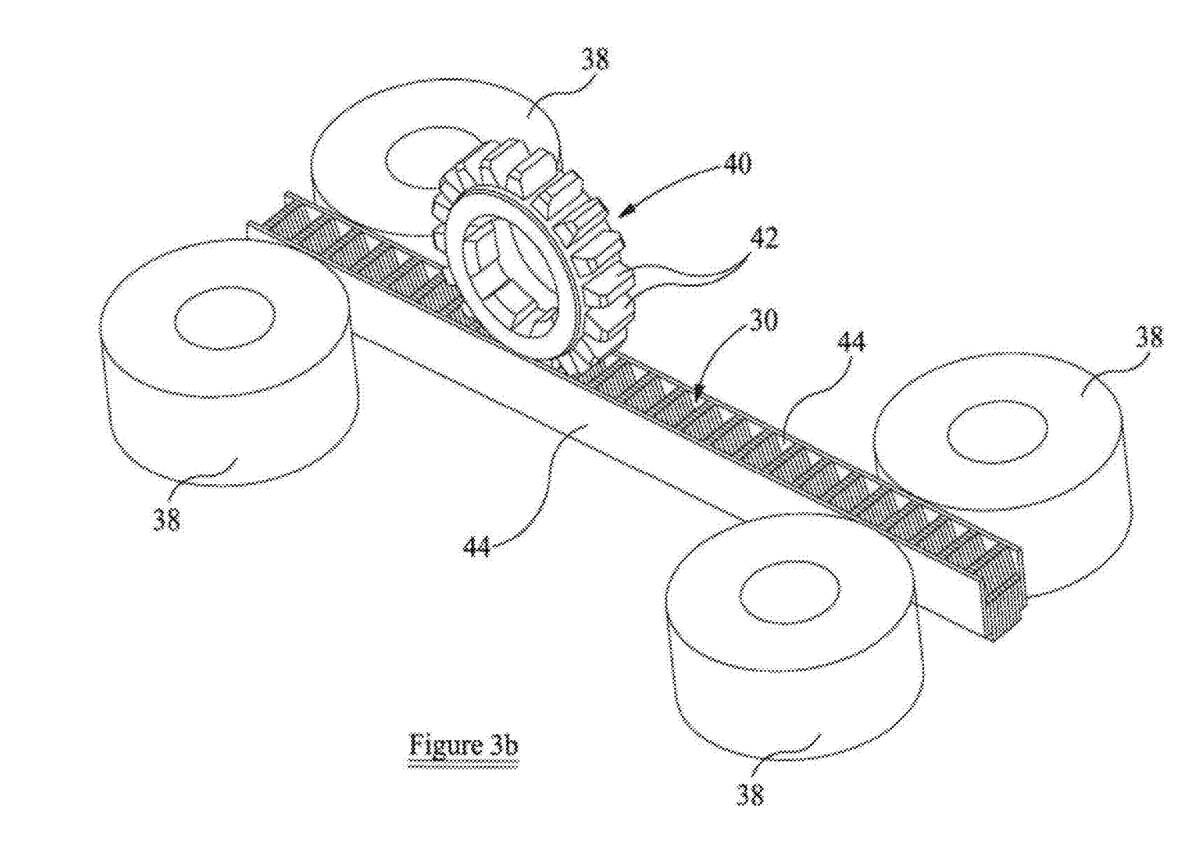
Figures 4A, 4B, 4C:
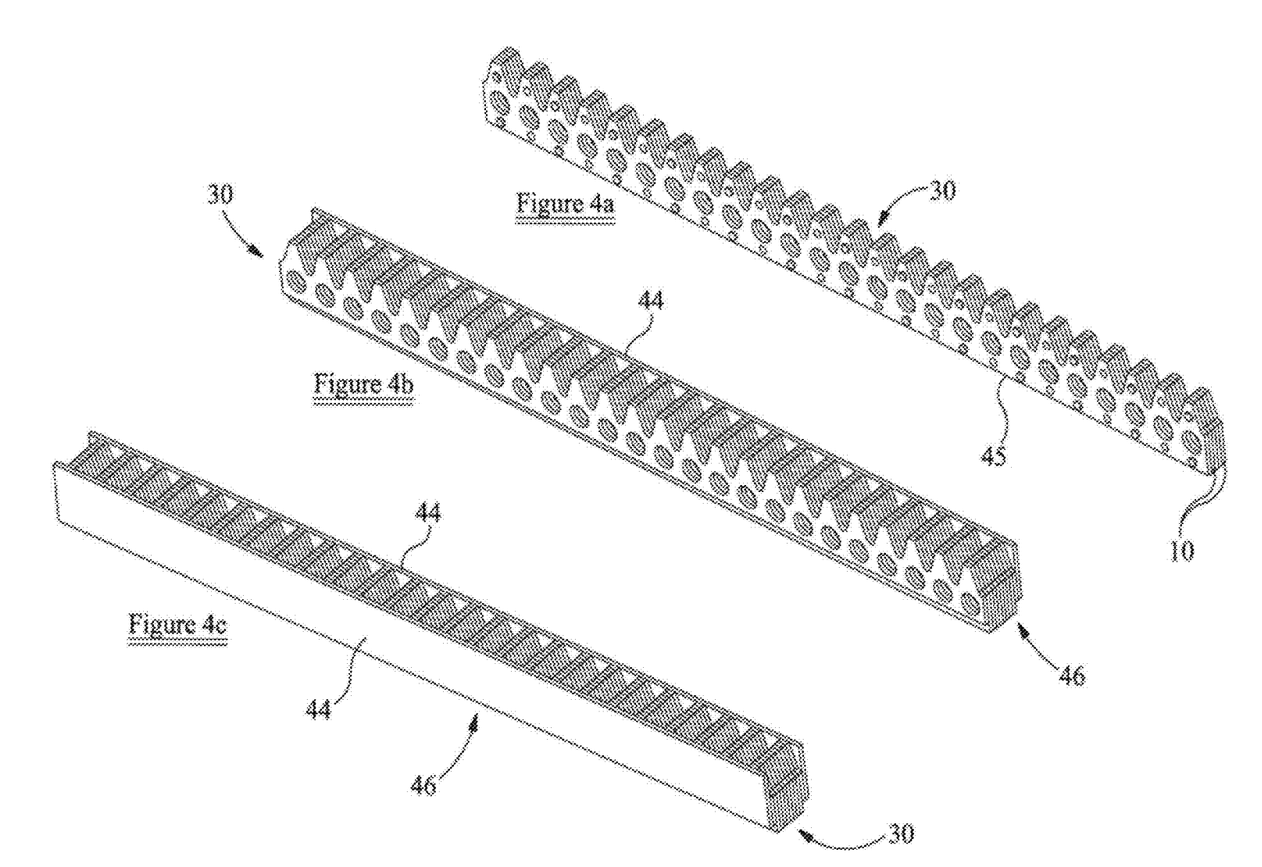
FIGS. 4a-4c show various embodiments of the laminate rack according to the present invention.

FIGS. 2d and 3b represent the final induction heating of the stack 30. At this stage, the copper paste is fused to the strips 10 to which it is adjacent. During the copper brazing, the copper flows/wicks in between the interference features or very close surfaces i.e. the primary features 22 & 24. The stack 30 of strips or laminates 10 is thus brazed, under pressure by a set of pinch rollers 38, to form a rack 45 (e.g. as shown in FIG. 4a). Teeth 42 of a driven gear 40 pitch time the profiled stack 30 during the brazing process.

In contrast to FIGS. 2c and 3a, FIGS. 2d and 3b show groups of laminates 30a, 30b aligned with respect to each other—i.e. not staggered. This arrangement will be discussed in further detail with regard to FIG. 5.

FIG. 3b also shows shielding 44, which may be added to the outer surfaces of the stack 30. It is to be noted that the shielding 44 may be provided on one or both sides of the stack 30. FIG. 4a shows the stack 30 without any shielding, FIG. 4b shows the stack with shielding 44 provided along one side, and FIG. 4c shows the stack 30 with shielding 44 provided on both sides. FIG. 4a thus represents a finished rack 45, without any shielding, which could be used in a stairlift rail (see e.g. FIG. 5). FIGS. 4b and 4c represent a finished rack 46 with shielding 44 for use in a stairlift rail (not shown). A wheel, gear or roller (not shown) provided within the stairlift carriage is configured to run along the rack 45, 46. The wheel/tooth arrangement controls the movement of the stairlift along the rack 45, 46.

The shielding may be brazed to the stack 30, e.g. using copper paste as before. Alternatively, the shield 44 may simply be welded on. Alternatively, the shield 44 could be clipped on or pressed in to the outer strips 10 of the stack 30, into cavities provided therein e.g. the apertures 16 or other dedicated cavities (not shown). Known stairlift rails require machining a bevel into an extruded rack for affixing shielding thereto. The above ways of fixing shielding to a laminate rack thus advantageously provide a cost saving, and simplify manufacture, compared with the known rails.

The shielding is also beneficial from a health and safety point of view. The teeth of the stack 30 can be sharp and, if left exposed, could be dangerous. Applying the shielding 44 thus advantageously encompasses the toothed rack and hides the peaks 12 of the stack 30. The shielding may also assist in keeping the wheel or gear on the stairlift rack.

Figure 5:
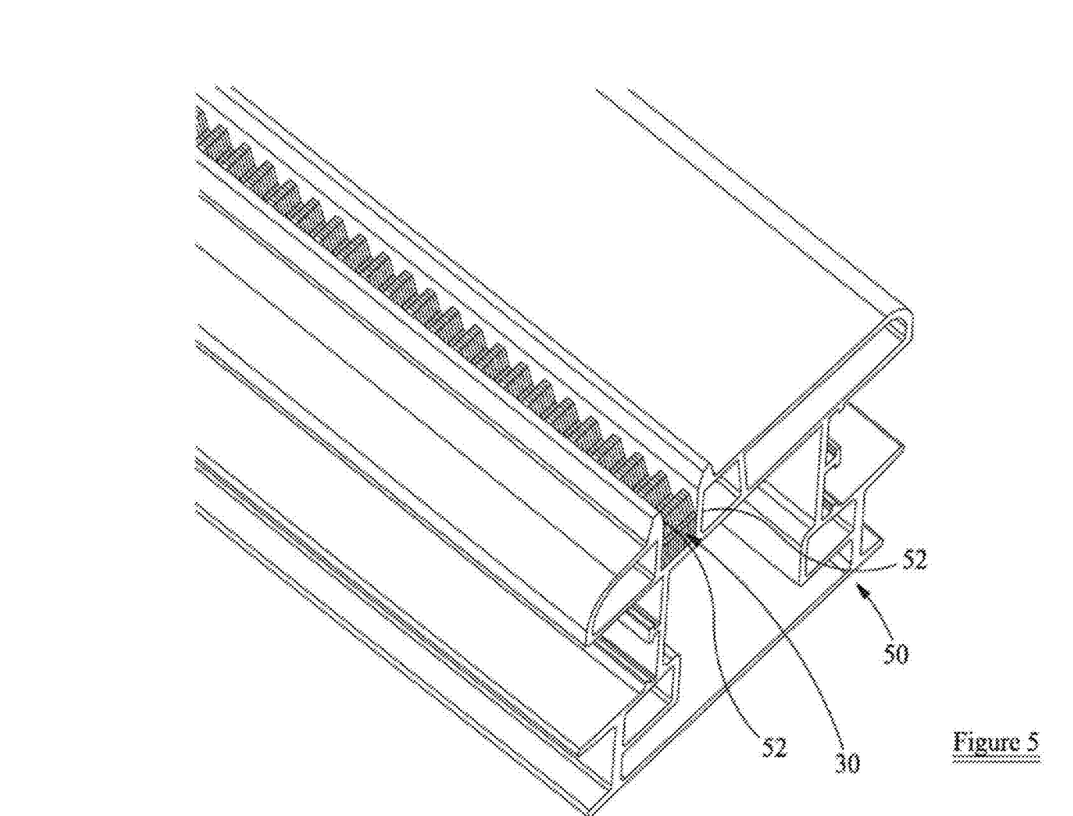
FIG. 5 shows an exemplary laminate rack in situ within a straight stairlift rail section.
Figure 6:
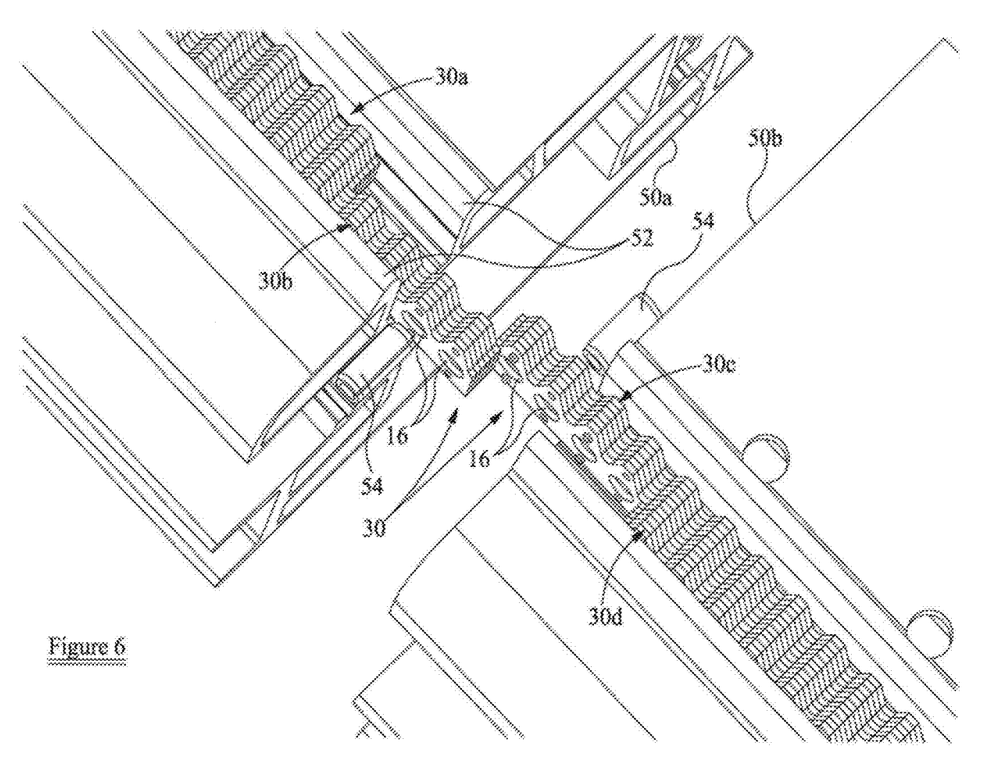
FIG. 6 shows an exemplary laminate rack joint assembly of a straight stairlift rail section.

Alternatively, the rack 45 in laminate form could be used in a rail system without the shielding. FIGS. 5 and 6 show examples of laminate racks 45 provided within a stairlift rail casing 50. The rail 50 may be mounted (e.g. bolted) to the treads of stairs (not shown). The support rail 50 may typically be formed from extruded aluminium. Brackets 52 of the support rail 50 captivate the laminates 30. In such embodiments, copper brazing would be optional as the captivation within the rail 50 would secure the laminates 10 together and in situ within the rail 50. The interference features 20, 22, 24 may, however, be used to help secure the laminates together.

In FIG. 5, a stairlift chair (not shown) would be mounted on a carriage which comprises a roller or gear that is driven (e.g. by a motor) to transport the carriage along the rail (e.g. up and down a flight of stairs).

The stairlift rail 50 of FIG. 5 may be formed from a plurality of discrete sections. FIG. 6 shows an exemplary joint between two stairlift rail sections 50a, 50b. As for the embodiment of FIG. 5, the brackets 52 can be used to secure the laminates 10 together and within the rail 50 without the need for copper brazing. Additionally, the laminates 50 may be joined by staggering/overlapping groups of laminates 10 in order to ensure a correct pitch and alignment along the length of the rail 50. For example, in FIG. 6, a first section of stairlift rail 50a comprises a first group of laminates 30a and a second group of laminates 30b staggered with respect to each other. A second section of stairlift rail 50b comprises a first group of laminates 30c and a second group of laminates 30d also staggered with respect to each other. The staggering of the laminates 30a, 30b of the first rail section 50a is opposite to that of the laminates 30c, 30d of the second rail section 50b. This allows for the laminates 30a, 30c to be aligned end to end and simultaneously for the laminates 30b, 30d to be aligned end to end to effectively form a continuous laminate rack 45. The laminates 30b, 30c may be secured together with fastening means such as rivets or pins 54.

Figure 7A:
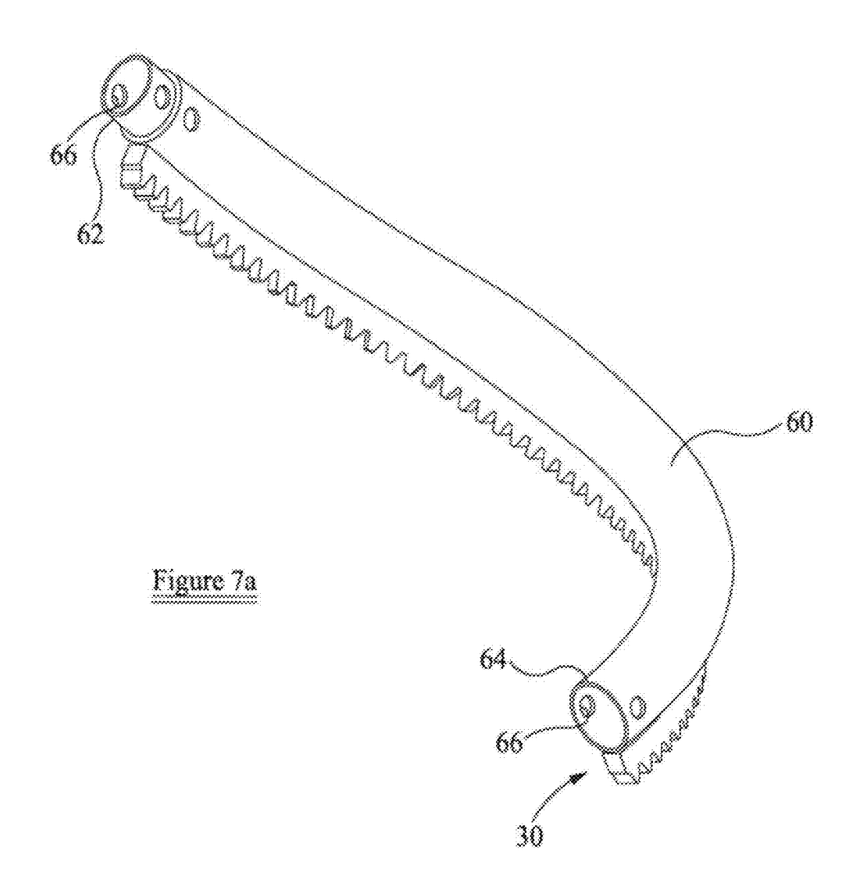
FIG. 7a illustrates a laminate rack according to another embodiment of the invention.
Figure 7B:
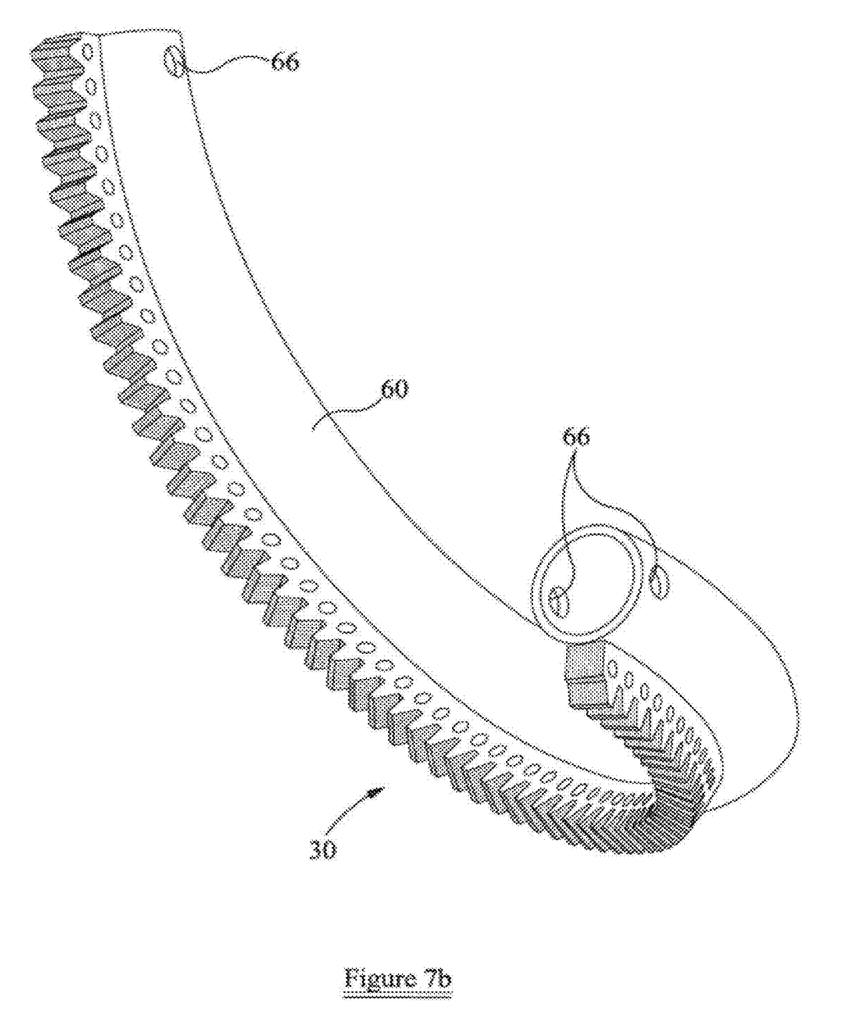
FIG. 7b illustrates a laminate rack according to another embodiment of the invention.

The above discussion relates to straight stairlift rails, but embodiments of the invention may also be employed in curved stairlift rails. Referring to FIGS. 7a and 7b, a curved guide rail section 60 is shown. A curved rail 60 may be formed from a straight section (e.g. as described above) by bending the rack on a specially set bending machine (not shown) in order to get the desired curvature (radius and/or helix) and maintain the desired profile alignment. Securing the laminates together by brazing enables the laminated stack 30 to be bent isotropically. That is to say, securing the laminates together by brazing, as discussed above, ensures that the laminates do not move with respect to each other as the rack is bent into the desired shape—i.e. their respective positional relationship is maintained. This is important to ensure the true pitch of the rack is not altered. Embodiments of the invention therefore provide for manufacturing and manipulating a homogeneous rack of substantially uniform thickness from a plurality of elongate strips.

The stack of laminates 30—which form the drive rail 60—may be attached to the rail 60 e.g. by welding. The carriage of the stairlift (not shown) is typically mounted around the guide rail 60 and the stairlift (not shown) is moveable along drive rail 30 via a roller or gear (not shown) provided within the stairlift carriage. One end 62 of the guide rail 60 may be provided with a joint plug, which may be inserted into the end of the rail 60, or may be formed integrally therewith. The plug 62 can be inserted into an end 64 of another guide rail section 60. Apertures 66 are provided in the guide rail 60. A securing member e.g. a bolt (not shown) may be used to secure adjacent sections 60 together via the apertures 66 on the adjacent rail ends 62, 64.

Figure 8:
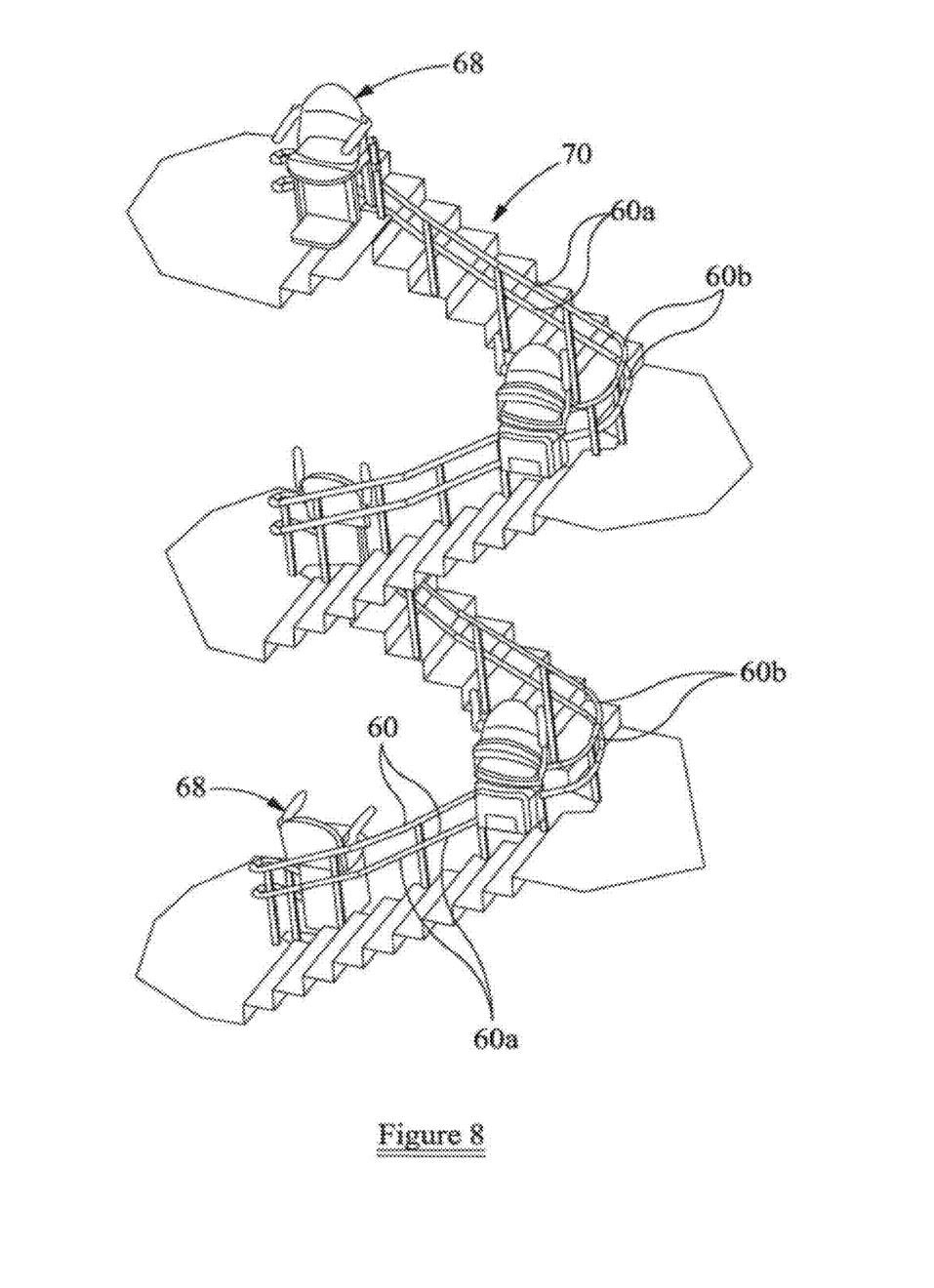
FIG. 8 shows sections of laminate rack according to embodiments of the invention in use in a complex multi-flight set of stairs.

Differently curved sections 60 may therefore be coupled together in order to form the desired length of rail. This arrangement may advantageously be employed in situations where the stairs are not straight, for example, where they bend or curve around a corner. The rails 30, 60 may be any length and may bend/curve through any angle including 90 degrees (for example). For example, FIG. 8 shows a stairlift 68 mounted in a stairwell 70. The stairlift 68 travels along a pair of drive rails 60. A wheel, gear and/or roller (not shown) provided within the carriage of the stairlift 68 is configured to run along the drive rails 60. The rails 60 comprise a plurality of straight rail sections 60a and curved rail sections 60b. Embodiments of the invention thus provide a system that is fully adaptable for any stairwell or set of stairs, whether it is straight or curved or a mixture of each in different locations. Being able to use the same racks for both the straight and curved sections ensures homogeneity of the rack along the entire length of the rail, and provides for smooth transitions at the join of adjacent sections.

The invention claimed is:

1. A method of forming a curved rack, the method comprising:
   providing a plurality of elongate strips profiled to provide a profile to the rack;
   aligning the strips to provide a stack of strips having said profile;
   securing said plurality of strips together to form said rack, wherein said securing comprises at least one process selected from the group consisting of brazing, induction brazing, copper brazing, interference brazing, seam welding, and laser welding, and
   bending the rack while maintaining the positional relationship of adjacent strips.

2. The method of claim 1, wherein the rack is suitable for use in a stairlift rail.

3. The method of claim 1, further comprising providing a plurality of teeth.

4. A method of forming a composite rack, comprising forming a plurality of sections of rack according to claim 1, and joining said sections of rack together to form a length of rack.

5. The method of claim 1, wherein securing said plurality of strips together to form said rack further comprises providing features on some or all of the strips, said features being engageable with corresponding features on the strips adjacent thereto.

6. The method of claim 1, comprising removing portions of material from each of said strips so as to reduce the mass thereof.

7. A curved rack comprising a plurality of elongate strips secured together as a stack of strips to form said rack,
   wherein the strips are profiled and the strips are aligned to provide a profile to the rack,
   wherein adjacent strips are joined to one another and secured together in a union of two materials by at least one process selected from the group consisting of brazing, induction brazing, copper brazing, interface brazing, seam welding, and laser welding.

8. The rack of claim 7, wherein said rack is suitable for use in a stairlift rail.

9. The rack of claim 7, wherein each of the profiled strips comprises a plurality of teeth.

10. The rack of claim 7, wherein some or all of the strips comprise features that engage with each other to assist in securing them together.

11. A composite rack, comprising a plurality of sections of rack according to claim 7, said sections of rack being joined together to form a length of rack.

12. The rack of claim 7, wherein said rack is of a uniform thickness.

* * * * *